United States Patent [19]

Oswald et al.

[11] Patent Number: 4,792,272
[45] Date of Patent: Dec. 20, 1988

[54] CONTAINER HANDLING APPARATUS

[75] Inventors: Norman D. Oswald, Duncanville; Carl M. Franklin, Valley Mills; Marc H. Gutzler, Duncanville; Harry S. Mankey, Dallas, all of Tex.

[73] Assignee: Standard Manufacturing Company, Inc., Dallas, Tex.

[21] Appl. No.: 20,855

[22] Filed: Mar. 2, 1987

Related U.S. Application Data

[63] Continuation-in-part of Ser. No. 868,196, May 23, 1986, abandoned, which is a continuation of Ser. No. 569,604, Jan. 10, 1984, abandoned.

[51] Int. Cl.$^4$ ............................................... B60P 3/00
[52] U.S. Cl. ................................... 414/458; 254/9 C; 294/81.53; 294/907; 414/495
[58] Field of Search ..................... 414/458–461, 414/495; 254/9 C, 124, 45, 2 C; 294/81.4, 81.51, 81.52, 81.53, 81.61, 67.32, 907

[56] References Cited

U.S. PATENT DOCUMENTS

| | | | |
|---|---|---|---|
| 2,449,863 | 9/1948 | Ross | 254/2 C |
| 2,480,916 | 9/1949 | Gibson | 254/9 C X |
| 2,706,102 | 4/0955 | Cresci | 254/124 X |
| 2,874,805 | 2/1959 | Jahnel | 254/8 C X |
| 3,105,673 | 10/1963 | Williamson | 254/8 C X |
| 3,220,585 | 11/1965 | McCartney et al. | 254/8 C X |
| 3,246,876 | 4/1966 | Larson | 254/122 |
| 3,370,727 | 2/1968 | Shaw | 414/495 |
| 3,404,791 | 10/1968 | Larson | 254/122 X |
| 3,446,379 | 5/1969 | Phillips | 414/495 |
| 3,472,183 | 10/1969 | Goodman | 254/8 C X |
| 3,501,193 | 3/1970 | Gray | 294/81.53 |
| 3,513,999 | 5/1970 | Schwartz et al. | 414/460 |
| 3,556,580 | 1/1971 | Bridge | 294/81.51 |
| 3,698,581 | 10/1972 | Goyarts | 414/460 |
| 4,071,222 | 1/1978 | Wright | 254/124 X |
| 4,149,747 | 4/1979 | Portz et al. | 294/81.51 X |
| 4,166,712 | 9/1979 | Oberg | 414/458 X |
| 4,258,949 | 3/1981 | Keagbine | 294/81.53 X |
| 4,273,306 | 6/1981 | Chang | 248/421 |
| 4,396,218 | 8/1983 | Stevens | 294/81.53 X |
| 4,522,548 | 6/1985 | Oswald et al. | 414/458 |
| 4,526,346 | 7/1985 | Galloway et al. | 254/122 |

FOREIGN PATENT DOCUMENTS

| | | | |
|---|---|---|---|
| 1905516 | 5/1971 | Fed. Rep. of Germany | 294/81.4 |
| 398429 | 2/1974 | U.S.S.R. | 414/495 |

Primary Examiner—L. J. Paperner
Assistant Examiner—David A. Bucci
Attorney, Agent, or Firm—Michael A. O'Neil

[57] ABSTRACT

A container handling apparatus having a pair of side frames and a cross frame. The apparatus also has four lift mechanisms for attachment to a container. Each lift mechanism is mounted on one end of a secondary lift arm. Four primary lift arms are connected to the side frames and to the midpoint of each of the secondary lift arms. A cam follower on the lower end of each secondary lift arm follows a cam horizontally along one of the side frames. Hydraulic cylinders rotate the primary lift arms about a pivot connection to the side frames. This causes the upper ends of the secondary lift arms to move vertically to raise and lower the lift mechanisms and the container. Transducers connected between the primary arms and the side frames equalize the amount of rotation of each of the primary lift arms and automatically keep the positions of the four lift mechanisms at the same height.

16 Claims, 5 Drawing Sheets

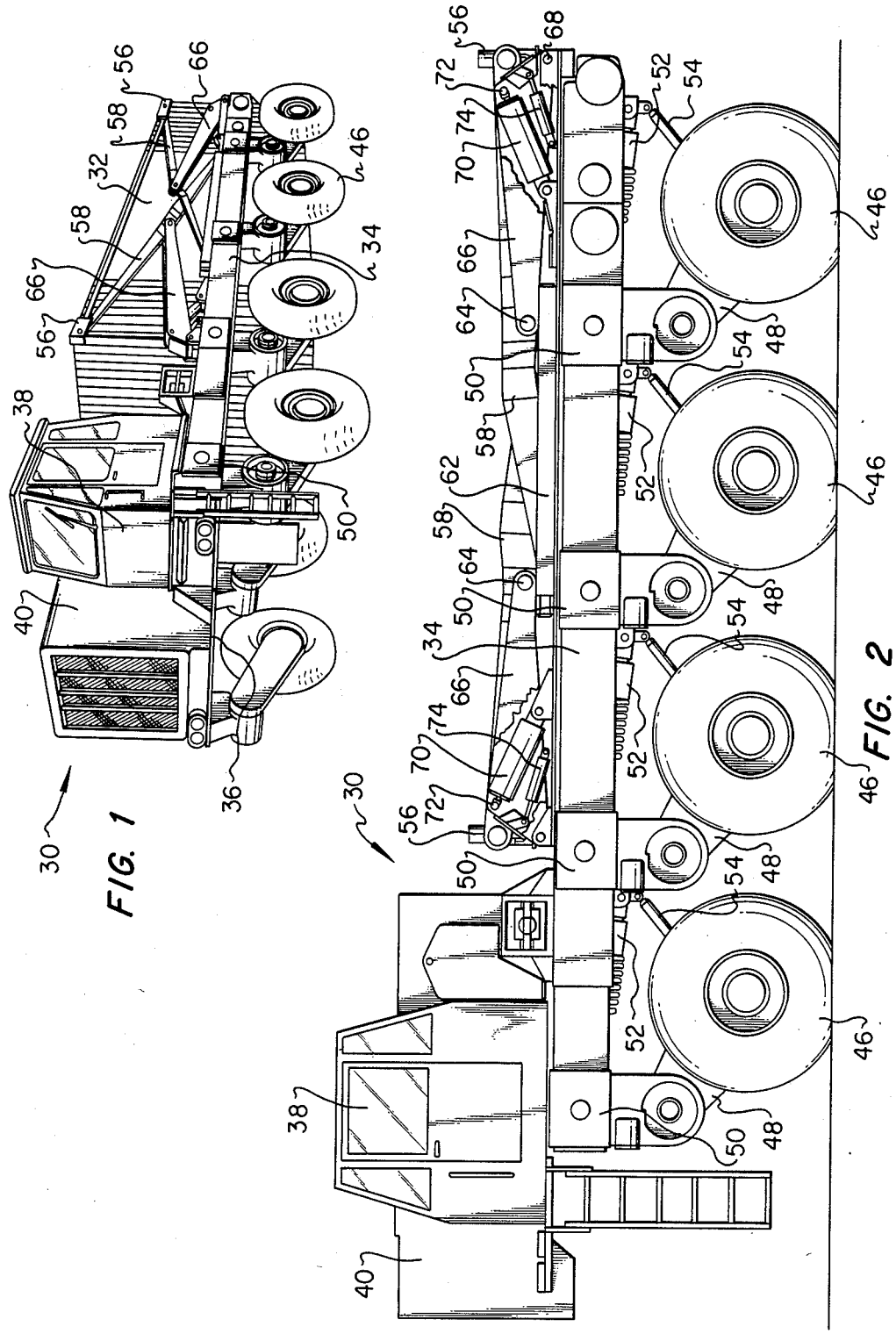

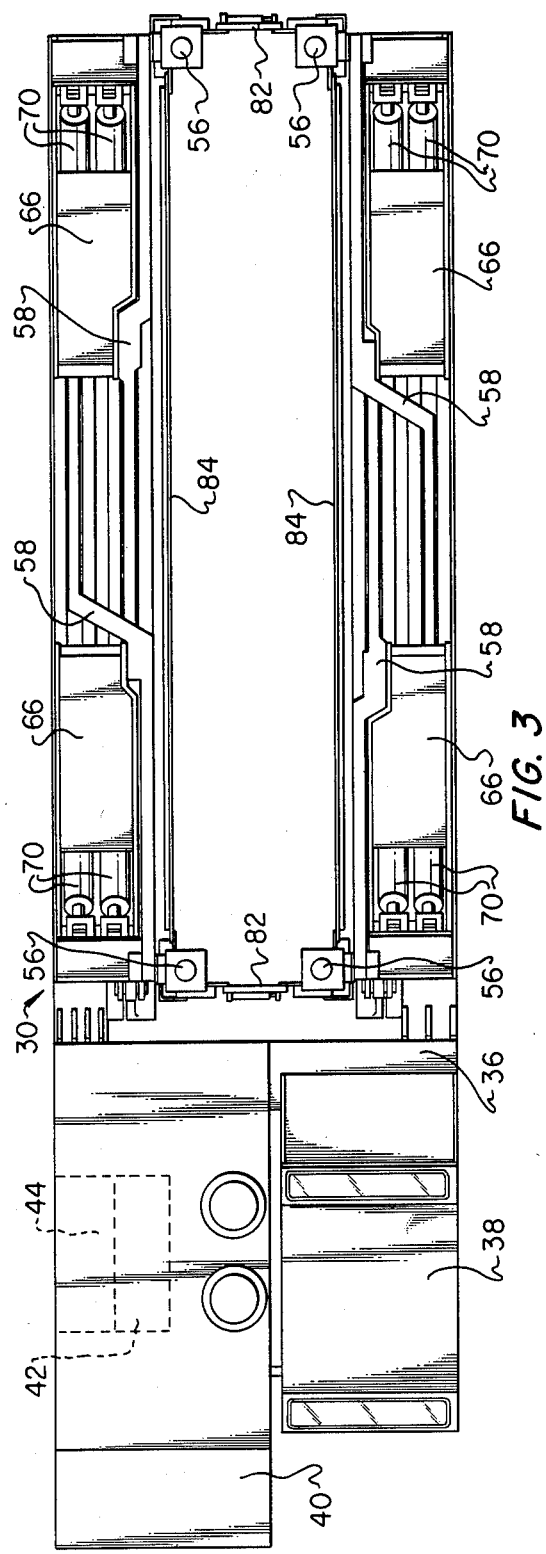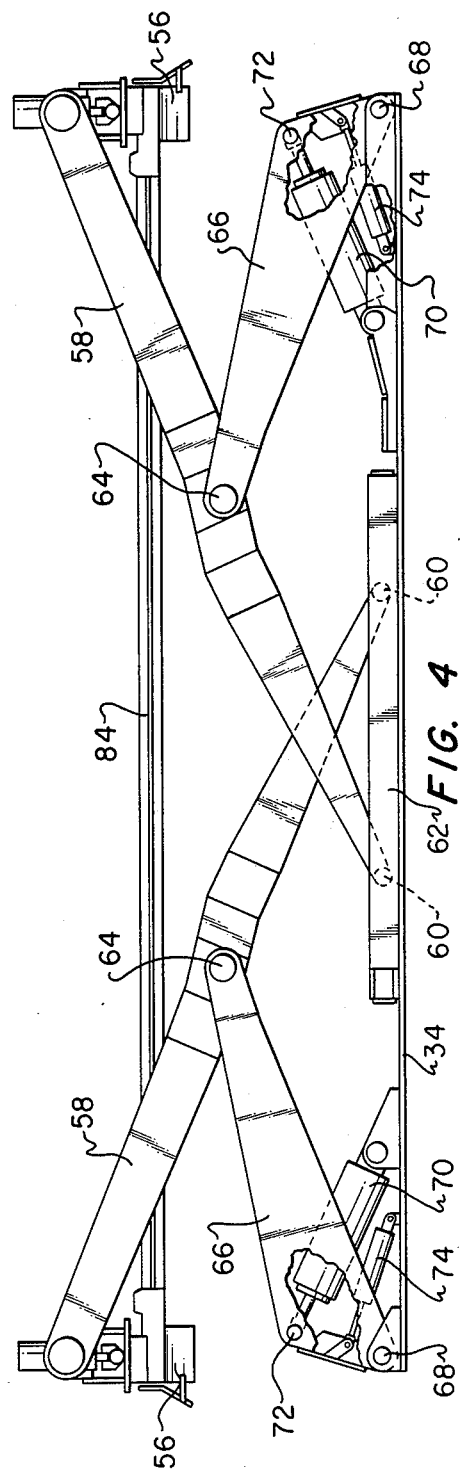

CONTAINER HANDLING APPARATUS

CROSS-REFERENCED TO RELATED APPLICATIONS

This application is a continuation-in-part of U.S. patent application Ser. No. 868,196, filed May 23, 1986, which was a continuation of U.S. patent application Ser. No. 569,604, filed Jan. 10, 1984, both now abandoned. U.S. patent application Ser. No. 569,604 is incorporated into this application by reference. Also incorporated by reference are U.S. Pat. No. 4,595,069, issued June 17, 1986, and U.S. Pat. No. 4,702,843.

TECHNICAL FIELD

The present invention relates generally to the handling of 8'×8'×20' containers of the type commonly used to transport and to temporarily store goods and materials. More particularly, the invention relates to apparatus for handling such containers under a variety of conditions, including various types of adverse terrain.

BACKGROUND AND SUMMARY OF THE INVENTION

Containers are used in the transportation and temporary storage of virtually all types of goods and materials. Usually, these containers have dimensions of 8'×8'×20', although 30' and 40' containers are also used. Apparatus for handling such containers include bridge cranes, stradle carriers, and forklift trucks.

Bridge cranes are permanent installations which are used at locations such as harbors to move containers onto and off of ships and barges. Although satisfactory for the intended purpose, bridge cranes cannot transport and handle containers at remote locations.

Stradle carriers are high, wide devices which carry containers in an elevated orientation. For this reason, stradle carriers tend to tip over when operated on soft or inclined surfaces.

In order to transport a container by means of a forklift truck, the length of the container must extend transversely to the direction of movement. This requires unnecessarily wide roadways, gates, and doorways, and may present a safety problem, since the forklift truck operator sometimes cannot see around the container during forward movement.

These problems become even more critical when containers are used in military applications. For example, landing craft are typically used to transport war materiel to beachheads. Stradle carriers are too large to enter landing craft, and the landing craft doors are not wide enough to permit the removal of containers in a sideways orientation. Also, neither stradle carriers nor forklift trucks are adapted for operation in surf, or on sand, or on steep surfaces often found at beachheads.

For these reasons, the present practice is to use a two-wheel trailer, pulled by a bulldozer or similar device, to remove containers from landing craft and to move the containers through the surf and across the beach to a suitable location. At this point, a stradle carrier, a forklift truck, or a crane places the container on a truck. The truck then hauls the container to its ultimate destination, where a second forklift truck or stradle carrier removes the container from the truck. Up to five pieces of equipment may be required to move a container from the interior of a landing craft to its ultimate destination.

Even at installations such as military bases, current procedures for handling containers are unsatisfactory. Containers are typically received at a central location from railroad cars or semi-trailers. Due to space limitations, neither stradle carriers nor forklift trucks can be used to transport the containers from the central receiving lcoation to the ultimate destinations, such as mess halls or ammo dumps. It is therefore necessary to unload each container at the central receiving location and to use trucks to transport the container contents to the ultimate destinations.

The present invention is a container handling apparatus which overcomes these and other problems long associated with the prior art. The container handling apparatus of the invention can transport containers across adverse terrain, such as through surf, across beaches, and over highly inclined surfaces. The apparatus of the present invention can also transport containers across obstacles such as rocks, logs, craters, ditches, and rubble. A container handling apparatus incorporating the invention can operate at speeds of up to 45 m.p.h. unloaded, and up to 25 m.p.h. loaded. Finally, the present invention can transport containers through relatively limited spaces, thereby facilitating both the removal of containers from landing craft and the positioning of containers at ultimate destinations, without unloading the contents of the containers onto trucks.

The container handling apparatus of the invention has a pair of elongated side frames, connected at the forward end by a cross frame. The frames are propelled and supported by a plurality of wheels, which are driven by a drive means.

The apparatus has four lift mechanisms for attachment to a container. Each lift mechanism is pivotally connected to one end of a secondary lift arm. Each lift mechanism has a tab for insertion into a slot on the container, and means for raising and lowering the lift mechanism relative to the secondary lift arm.

A cam follower is mounted on the lower end of each secondary lift arm. A plurality of cams guide each cam follower horizontally along one of the side frames. Each secondary lift arm is angled to avoid intersection with the other secondary lift arm.

A primary lift arm is pivotally connected to the midpoint of each secondary lift arm. The other end of each primary lift arm is pivotally connected to one of the side frames at a pivot connection. Each secondary lift arm is twice as long as each primary lift arm.

A power means, such as a plurality of hydraulic cylinders, rotates the primary lift arms about the pivot connections between the primary lift arms and the side frames. This causes the upper ends of the secondary lift arms to move vertically to raise and lower the lift mechanisms and the container. Equalizing means determines the position of each primary lift arm and automatically keeps the positions of the four lift mechanisms at the same height.

DESCRIPTION OF THE DRAWINGS

FIG. 1 is a perspective view of the container handling apparatus of the invention.

FIG. 2 is a side view of the container handling apparatus of the invention.

FIG. 3 is a top view of the container handling apparatus of the invention.

FIG. 4 is a side view of the lift arms of the invention, shown in a position between the uppermost position and the lowermost position.

DESCRIPTION OF THE PREFERRED EMBODIMENT

Figure 5:
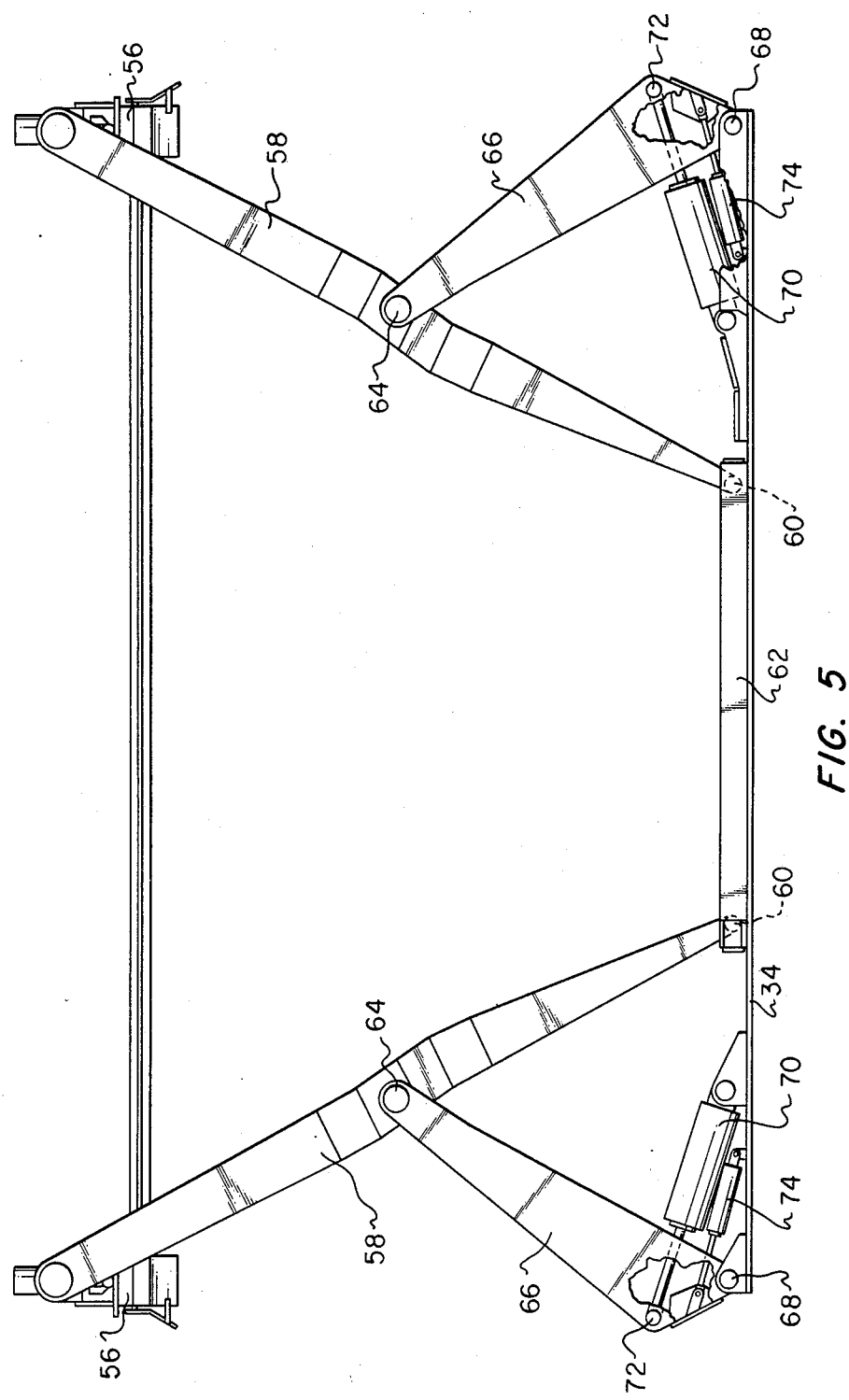
FIG. 5 is a side view of the lift arms of the invention, shown in the uppermost position.

FIGS. 1-3 illustrate the preferred embodiment of the container handling apparatus 30 of the invention. This container handling apparatus 30 is designed to carry an 8'×8'×20' container 32.

The container handling apparatus 30 has a pair of parallel side frames 34 and a cross frame 36. The cross frame 36 connects the forward ends of the two side frames 34. The rear ends of the side frames 34 are normally disconnected. The container handling apparatus 30 thus has a U-shape, so that the apparatus 30 can be backed against a container 32, and the container 32 can be received between the side frames 34.

The cross frame 36 may be extendable, so that the width of the container handling apparatus 30 can be adjusted. The apparatus and method of varying the width of the container handling apparatus is explained in detail in U.S. patent application Ser. No. 868,196, filed May 23, 1986, which has been incorporated by reference.

The cross frame 34 supports an operator's compartment 38 and an engine 40. The operator's compartment 38 may have dual controls to facilitate a rearward facing operator orientation during use of the apparatus 30 in container receiving and positioning, and a forward facing operator orientation during use of the apparatus 30 in container transportation mode. The engine 40 drives a pair hydraulic pumps 42, 44, which are also mounted on the cross frame 36. The hydraulic pumps 42, 44 are controlled by an electronic control system, which is disclosed in U.S. patent application Ser. No. 06/747,669, filed June 21, 1985. That disclosure is hereby incorporated by reference.

The engine 40 is also a drive means for driving eight wheels 46, to propel the container handling apparatus 30. Each wheel 46 is mounted on a secondary frame 48, which extends downward and rearward from a drop frame 50. The eight drop frames 50 are connected to the side frames 34. The wheels 46 thus support the side frames 34 and the cross frame 36. The wheels 46 can be inflated and deflated by a central tire inflation system disclosed in U.S. patent application Ser. No. 06/747,669, filed June 21, 1985.

A piston and cylinder assembly 52 is mounted between each secondary frame 48 and the associated side frame 34. Hydraulic power from the hydraulic pumps 42, 44 is supplied to the piston and cylinder assemblies 52 to pivot the secondary frames 48. Pivoting a secondary frame 48 raises and lowers the wheel 46 relative to the side frame 34. A shock absorber 54 is also mounted between each wheel 46 and the associated side frame 34 to provide a smoother ride.

The manufacture and operation of the piston and cylinder assemblies 52 are disclosed in U.S. Pat. No. 4,595,069, issued June 17, 1986, and U.S. Pat. No. 4,454,925, issued June 19, 1984. These two patents are hereby incorporated by reference. The control system described in U.S. patent application Ser. No. 06/747,669, filed June 21, 1985, can be used to coordinate positioning of the wheels 46 with drive commands or operating modes, or to position the wheels 46 individually in accordance with driver commands.

The container handling apparatus 30 has four upper lift mechanisms 56, each pivotally connected to one end of a secondary lift arm 58. The upper lift mechanisms 56 attach to the four upper corners of the container 32, so that the container 32 can be lifted by the lift arms 58, 66.

Mounted to the lower end of each secondary lift arm 58 is a cam follower 60, shown in FIG. 4. Each cam follower 60 is a roller, contained within a cam 62. Each cam 62 is mounted along one of the side frames 34. The cams 62 thus cause the cam followers 60, and the lower ends of the secondary lift arms 58, to move along a horizontal plane along the side frames 34.

The secondary lift arms 58 are angled to avoid intersection with the other secondary lift arm 58 on the same side of the apparatus 30. The angle also allows the upper ends of the secondary lift arms 58 to move in the same vertical plane, clearing the primary lift arms 66 when in the lowered position.

The midpoint 64 of each secondary lift arm 58 is pivotally connected to one end of a primary lift arm 66. The other end of each primary lift arm 66 is pivotally connected to one of the side frames 34 at a pivot point 68.

A pair of hydraulic piston and cylinder assemblies 70 are connected between one of the side frames 34 and each of the primary lift arms 66. The assemblies 70 are a power means for rotating the primary lift arms 66 about the pivot connections 68. Each cylinder assembly 70 is connected to a primary lift arm 66 at a pivot point 72, which is offset from the pivot point 68 between the primary lift arm 66 and the side frame 34. Thus, as the cylinder assembly 70 is extended, the primary lift arm 66 is pivoted about the pivot point 68 between the lift arm 66 and the side frame 34. Hydraulic power is provided to the cylinder assemblies 70 from the hydraulic pumps 42, 44.

Transducers 74 are connected between each of the primary lift arms 66 and the side frames 34. These transducers 74 measure the stroke of the pistons in the cylinder assemblies 70. The output voltage from each transducer 74 is fed into a microprocessor located in the operator's compartment 38. The microprocessor controls the speed of the lift cylinders 70, so that the four lift mechanisms 56 are raised and lowered at the same rate. The transducers 70 are thus an equalizing means for determining the position of each primary lift arm 66 and automatically keeping the positions of the lift mechanisms 56 at the same height.

FIGS. 2, 4, and 5 show the lift arms 58, 66 in three different positions. It can be seen that the length of the secondary lift arm 58 is twice as long as the length of the primary lift arm 66 from the pivot point 68 to the connection with the secondary lift arm 58. Therefore, the distance from the mid-point 64 of the secondary lift arm 58 to the upper lift mechanism 56 is equal to the distance from the mid-point 64 of the secondary lift arm 58 to the cam follower 60. These distances are also equal to the length of the primary lift arm 66 from the mid-point 64 to the pivot point 68.

Figure 6:
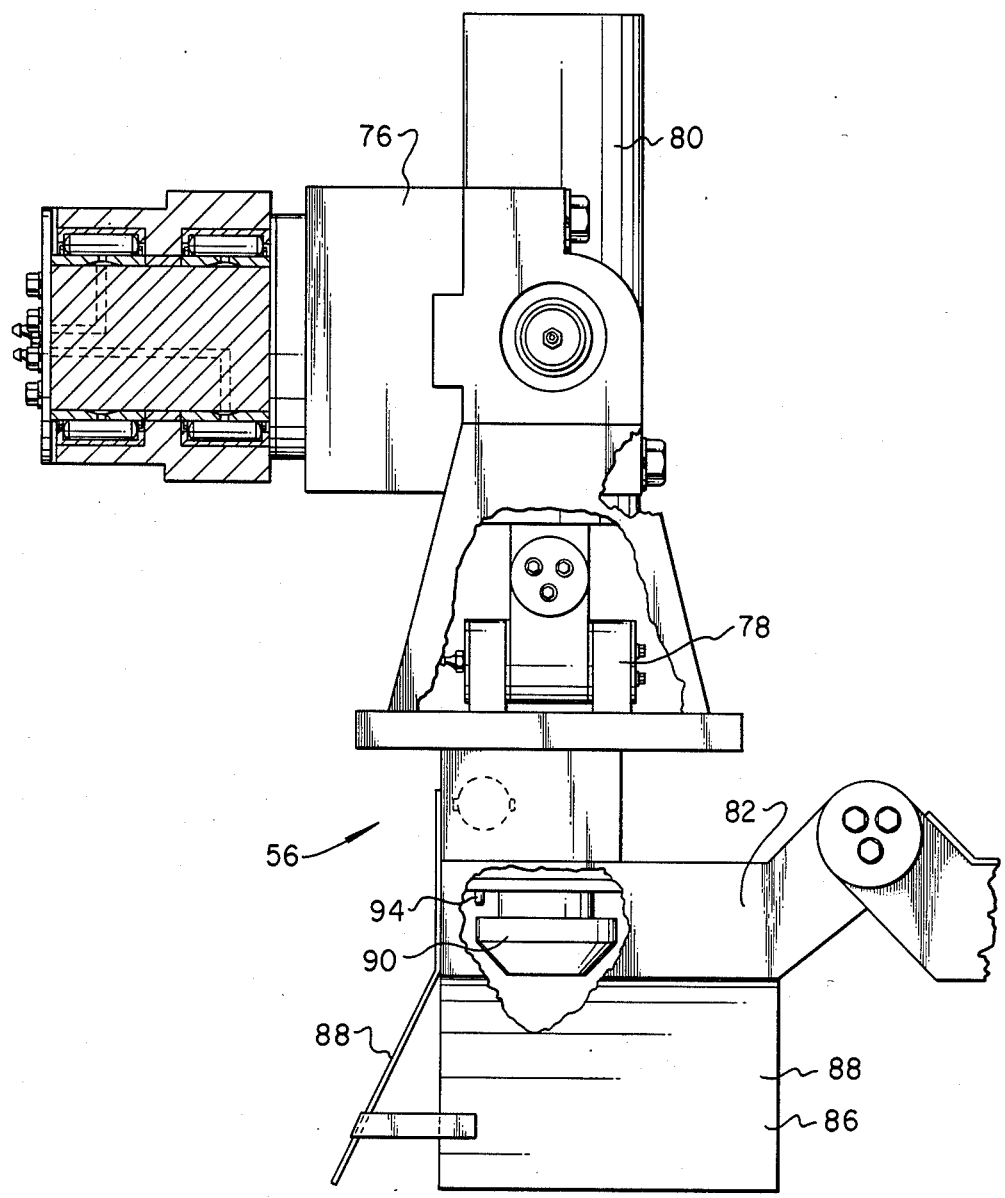
FIG. 6 is a front view of one of the lift mechanisms of the invention.
Figure 7:
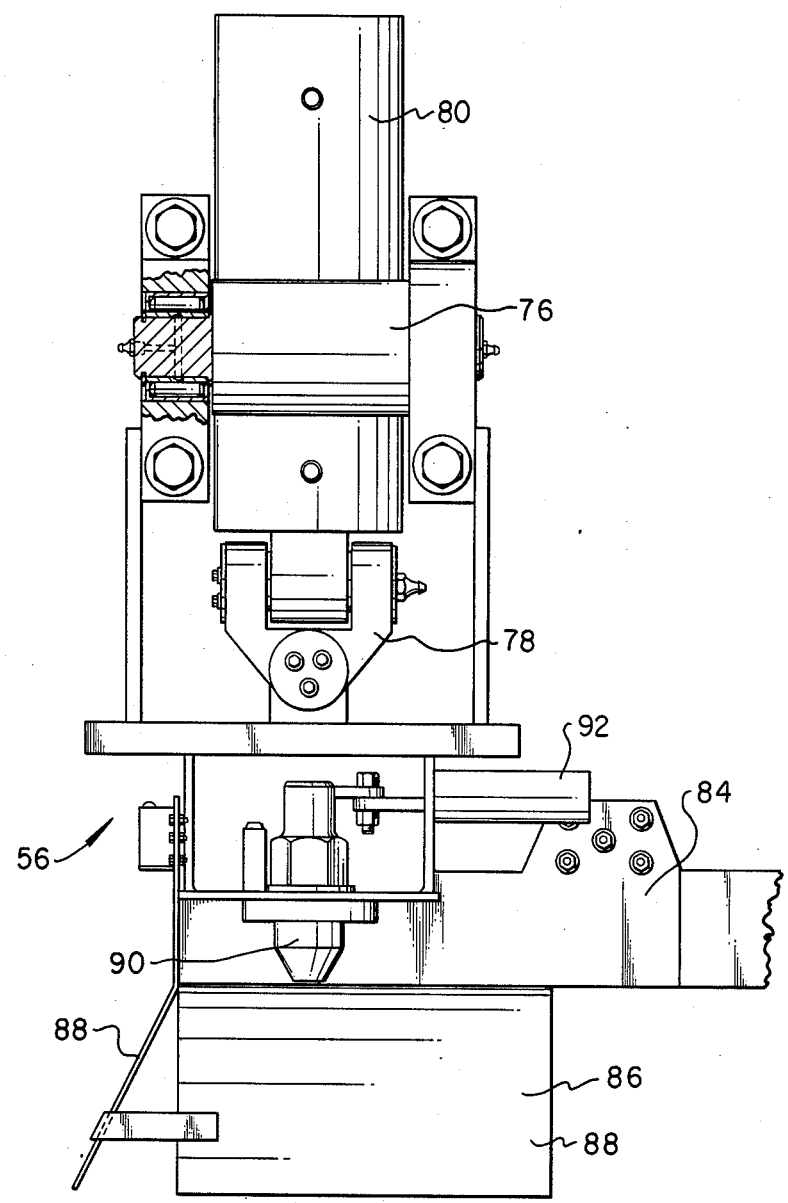
FIG. 7 is a side view of the lift mechanism of FIG. 6.

FIGS. 6 and 7 illustrate a typical upper lift mechanism 56. The lift mechanism 56 is connected to the upper end of a secondary lift arm 58 by a series of trunnion mounts 76. The trunnion mounts 76 allow the lift mechanism 56 to swing freely from the secondary lift arm 58.

The lift mechanism 56 is suspended from the trunnion mounts 76 by a swivel 78. A lift cylinder 80 is provided as a means for raising and lowering the swivel 78 and the lift mechanism 56 relative to the trunnion mounts 76 and the upper ends of the secondary lift arms 58.

The four lift mechanisms 56 are connected together by spacer bars 82, 84. Lateral spacer bars 82 connect the two front lift mechanisms 56 and the two rear lift mechanisms 56. Longitudinal spacer bars 84 connect the two left lift mechanisms 56 and the two right lift mechanisms 56.

A guide plate assembly 86 is mounted on the upper lift mechanism 56 to guide the lift mechanism 56 down onto the corner of the container 32. The guide plate assembly 86 consists of a pair of angled plates 88, which are connected to the lift mechanism 56.

The upper lift mechanism 56 has a tab 90 for insertion into a slot on the container 32. The tab 90 is rotatable between a locked position and an unlocked position. The locked position is shown in the drawings. A hydraulic cylinder 92 is used to rotate the tab 90 between the locked and unlocked positions. The hydraulic cylinder 92 can indicate to the operator whether the tab 90 is in the locked or the unlocked position.

A plunger 94 is mounted on the lift mechanism 56 near the tab 90. The plunger 94 is a means for indicating to the operator whether the lift mechanism 56 is in contact with a container 32.

The operation of the container handling apparatus 30 will be explained beginning with the apparatus 30 in the configuration shown in FIGS. 2 and 3. First, the cross frame 36 is hydraulically extended until the side frames 34 are far enough apart to flank the container 32.

Hydraulic power is then applied to the hydraulic piston and cylinder assemblies 70. As the hydrualic cylinders 70 extend, the primary lift arms 66 are rotated about the pivot points 68. Rotation of the primary lift arms 66 causes the midpoints 64 of the secondary lift arms 58 to rotate. The cams 60 on the lower ends of the secondary lift arms 58 move horizontally along the cam followers 62. The rotation of the midpoints 64 and the horizontal movement of the cams 60 cause the upper ends of the secondary lift arms 58 to move vertically upward. The hydraulic cylinders 70 are extended until the upper lift mechanisms 56 are in a position slightly above the top of the container 32, as shown in FIG. 4.

The apparatus 30 is then backed against the container 32, as shown in FIG. 1. The hydraulic cylinders 70 are then retracted to lower the lift mechanisms 56. As the lift mechanisms 56 approach the container 32, the guide plate assemblies 86 guide the lift mechanisms 56 onto the corners of the container 32. When the lift mechanisms 56 are close to the container 32, the lift cylinders 80 lower the lift mechanisms 56 until the tabs 90 are inserted into slots on the container 32.

When the lift mechanism 56 is completely on the container 32, the container 32 contacts the plungers 94, which give an indication to the operator. The hydraulic cylinders 92 are then activated to rotate the tab 90 to the locked position, as shown in FIGS. 6 and 7. The hydraulic cylinders 92 give an indication to the operator when the tabs 90 are in the locked position.

The hydraulic cylinders 70 are then extended to raise the lift mechanisms 56 and the container 32. The apparatus 30 is then driven to the destination.

At the destination, the apparatus 30 is maneuvered to place the container 32 above the location where it is to be set down. The container may be placed on a truck or stacked on another container. If necessary, the wheels 46 can be extended to increase the lift range of the apparatus 30. The hydraulic cylinders 70 are then retracted to lower the lift mechanisms 56 and the container 32.

The hydraulic cylinders 92 then unlock the tabs 90, and the lift mechanisms 56 are raised to remove the tabs 90 from the container 32. The apparatus 30 is then driven away from the container 32. The lift mechanisms 56 are then lowered to the position shown in FIG. 2, and the cross frame 36 is retracted to the position shown in FIG. 3.

The container handling apparatus 30 of the invention has several advantages over the prior art. The apparatus 30 has a unique lifting system, which requires a minimum of hydraulic power and a minimum of space. Although sufficiently powerful, the apparatus 30 is relatively easy and inexpensive to manufacture and to maintain.

Only the preferred embodiment of the invention has been illustrated. It should be understood that the invention is not limited to the embodiment disclosed, but is capable of numerous rearrangements, modifications, and substitutions of parts and elements without departing from the spirit of the invention.

We claim:
1. A container handling apparatus comprising:
a parallel pair of elongated side frames;
a cross frame connecting the side frames at one end;
the side frames being normally disconnected at the other end, so a container can be received between the two side frames;
a plurality of wheels supporting the side frames and the cross frames;
four lift mechanisms for attachment to a container;
four secondary lift arms, two of the secondary lift arms mounted to each of the side frames, each of the two secondary lift arms mounted to the same side frame having an upper end moving in the same vertical plane as the upper end of another secondary lift arm and each having a lower end laterally spaced from said upper end for movement in parallel overlapping vertical planes with the lower end of said other secondary lift arm mounted on the same side frame;
means for pivotally connecting the upper end of each secondary lift arm to one of the lift mechanisms;
four primary lift arms;
means for pivotally connecting one end of each primary lift arm to the midpoint of a corresponding one of the secondary lift arms;
means pivotally connecting the other end of each primary lift arm to one of the parallel side frames;
each primary lift arm having a length one-half as long as each secondary lift arm;
a cam follower mounted on the lower end of each of the secondary lift arms;
a plurality of cams for guiding each of the cam followers along one of the side frames; and
power means for rotating the primary lift arms about the pivot conenctions to the side frames to cause the upper ends of the secondary lift arms to move vertically to raise and lower the lift mechanisms and the container.

2. A container handling apparatus as recited in claim 1, wherein the power means is a plurality of cylinder and piston assemblies connected between the side frames and the primary lift arms.

3. A container handling apparatus as recited in claim 1, wherein the power means is eight cylinder and piston assemblies, connected in pairs between the side frames and each of the primary lift arms.

4. A container handling apparatus as recited in claim 1, wherein two primary lift arms are connected to one of the side frames and the other primary lift arms are connected to the other side frame.

5. A container handling apparatus as recited in claim 2, wherein two primary lift arms are connected to one of the side frames and the other primary lift arms are connected to the other side frame.

6. A container handling apparatus as recited in claim 1, further comprising means for controlling extension of the primary lift arms so that the primary lift arms extend at the same rate.

7. A container handling apparatus comprising:
a parallel pair of elongated side frames;
a cross frame connecting the side frames at one end;
the side frames being normally disconnected at the other end so a container can be received between the two side frames;
a plurality of wheels supporting the side frames and the cross frames;
four lift mechanisms for attachment to a container, each mechanism having a tab for insertion into a slot on the container and means for rotating the tab to lock the tab into the slot;
four secondary lift arms, two of the secondary lift arms mounted to each of the side frames, each of the two secondary lift arms mounted to the same side frame having an upper end pivotally connected to a corresponding one of the lift mechanisms for movement in the same vertical plane as the upper end of another secondary lift arm; each secondary lift arm having a lower end that is laterally offset from its upper end for movement in a vertical plane parallel to and overlapping the vertical plane traveled by the lower end of said other secondary lift arm mounted on the same side frame;
four primary lift arms, each having one end pivotally connected to the midpoint of one of the secondary lift arms and the other end pivotally connected to one of the side frames, each secondary lift arm having a length twice that of each primary lift arm;
a cam follower mounted on the lower end of each of the secondary lift arms;
a plurality of cams for guiding each of the cam followers along the side frames in said parallel overlapping paths; and
power means for rotating the primary lift arms about the pivot connections to the side frames to cause the upper ends of the secondary lift arms to move vertically to raise and lower the lift mechanisms and the container.

8. A container handling apparatus as recited in claim 7, wherein the power means is a plurality of cylinder and piston assemblies connected between the side frames and the primary lift arms.

9. A container handling apparatus as recited in claim 7, wherein the power means is eight cylinder and piston assemblies, connected in pairs between the side frames and each of the primary lift arms.

10. A container handling apparatus as recited in claim 7, wherein two primary lift arms are connected in spaced relationship to one of the side frames and the other primary lift arms are connected in spaced relationship to the other side frames.

11. A container handling apparatus as recited in claim 8, wherein two primary lift arms are connected to one of the side frames and the other primary lift arms are connected to the other side frame.

12. A container handling apparatus as recited in claim 9, wherein two primary lift arms are connected to one of the side frames and the other primary lift arms are connected to the other side frame.

13. A container handling apparatus comprising:
a parallel pair of elongated side frames;
a cross frame connecting the side frames at one end;
the side frames being normally disconnected at the other end so a container can be received between the two side frames;
a plurality of wheels supporting the side frames and the cross frames;
four lift mechanisms for attachment to a container, each mechanism having a tab for insertion into a slot on the container and means for rotating the tab to lock the tab into the slot;
four secondary lift arms, two of the secondary lift arms mounted to each of the side frames, each of the two secondary lift arms mounted to the same side frame having an upper end pivotally connected to a corresponding one of the lift mechanisms for movement in the same vertical plane as the upper end of another secondary lift arm, each secondary lift arm having a lower end that is laterally offset from its upper end for movement in a vertical plane parallel to and overlapping the vertical plane traveled by the lower end of said other secondary lift arm mounted on the same side frame;
four primary lift arms, each having one end pivotally connected to the midpoint of one of the secondary lift arms and the other end pivotally connected to one of the side frames, each secondary lift arm having a length twice that of each primary lift arm;
a cam follower mounted on the lower end of each of the secondary lift arms;
a plurality of cams for guiding each of the cam followers along the side frames in said parallel overlapping paths;
power means for rotating the primary lift arms about the pivot connections to the side frames to cause the upper ends of the secondary lift arms to move vertically to raise and lower the lift mechanisms and the container; and equalizing means for determining the position of each primary lift arm and automatically keeping the positions of the four lift mechanisms at the same height.

14. A container handling apparatus as recited in claim 13, wherein the power means is a plurality of cylinder and piston assemblies connected between the side frames and the primary lift arms.

15. A container handling apparatus as recited in claim 13, wherein the power means is eight cylinder and piston assemblies, connected in pairs between the side frames and each of the primary lift arms.

16. A container handling apparatus as recited in claim 13, wherein two primary lift arms are connected to one of the side frames and the other primary lift arms are connected to the other side frame.

* * * * *